United States Patent [19]

Roberts

[11] 4,026,965

[45] May 31, 1977

[54] UNSATURATED POLYESTER WITH THERMOPLASTIC GRAFTS USING CALCIUM HYDROXIDE AS GELLING AGENT

[75] Inventor: Michael G. Roberts, Heath, Ohio

[73] Assignee: Owens-Corning Fiberglas Corporation, Toledo, Ohio

[22] Filed: Aug. 27, 1976

[21] Appl. No.: 718,248

Related U.S. Application Data

[62] Division of Ser. No. 502,690, Sept. 3, 1974, Pat. No. 3,992,479.

[52] U.S. Cl. .............................. 260/862; 260/40 R; 260/22 CB; 260/879; 260/880 R
[51] Int. Cl.² ................... C08L 67/06; C08L 9/04; C08L 9/08
[58] Field of Search ..................... 260/40 R, 862

[56] References Cited

UNITED STATES PATENTS

| 2,568,331 | 9/1951 | Frilette | 260/40 R |
| 3,219,604 | 11/1965 | Fischer | 260/40 R |
| 3,431,320 | 3/1969 | Baum et al. | 260/865 |
| 3,857,812 | 12/1974 | Nowak et al. | 260/40 R |
| 3,862,064 | 1/1975 | Fry | 260/861 |
| 3,883,612 | 5/1975 | Pratt et al. | 260/862 |

FOREIGN PATENTS OR APPLICATIONS

| 1,943,181 | 7/1970 | Germany | 260/862 |

OTHER PUBLICATIONS

Warner, K. N. "Mechanism of the Thickening of Polyester by Alkali Earth Oxides and Hydroxides" in Soc. Plast. Ind., Inc., 28th ATC, (1973) BPCl, sec. 19-E, pp. 1–12.

*Primary Examiner*—John C. Bleutge
*Assistant Examiner*—T. DeBenedictis, Sr.
*Attorney, Agent, or Firm*—John W. Overman; Philip R. Cloutier; Ronald C. Hudgens

[57] ABSTRACT

Low pressure molding compounds comprising a thermosetting resin and a thermoplastic resin are gelled with calcium hydroxide within a specific concentration range to produce compounds moldable at low pressures.

9 Claims, No Drawings

UNSATURATED POLYESTER WITH THERMOPLASTIC GRAFTS USING CALCIUM HYDROXIDE AS GELLING AGENT

Reference is hereby made under 35 USC 120 to copending application Ser. No. 502,690 filed Sept. 3, 1974 now U.S. Pat. No. 3,992,479, of which this is a divisional application.

This invention relates to thermosetting molding compounds.

In one of its more specific aspects, this invention relates to moldable compositions comprising at least one crosslinked thermosetting polyester resin in combination with at least one thermoplastic resin, the latter being contained as the disperse phase in the thermosetting resin.

The production and use of sheet and bulk molding compounds are well known. Such molding compounds are based upon unsaturated polyester resin systems and are widely used in the production of automobile body parts. Usually such systems are based upon a combination of an unsaturated polyester resin contained in a monomer and a thermoplastic soluble in the monomer. These materials, in the form of a syrup, are blended with gelling agents, crosslinking catalysts, release agents and, optionally, colorants, inhibitors, and the like.

This blend of materials is produced in sheet form by laying down a first layer of the molding composition on a first layer of polyethylene film or the equivalent thereof, laying on this first layer of the molding composition a filler, for example, chopped glass fibers in an amount up to about 30 percent by weight of the total composition, and laying thereover a second layer of the molding composition. The two layers of molding composition with the filler sandwiched therebetween are then topped with a second sheet of polyethylene film and the composite is stored. During storage, the composite thickens to a viscosity at which the polyethylene film can be stripped from the composite with no substantial adherence of the molding composition to the film. At this viscosity, upon molding, the molding composition carries the filler with it to produce a substantially uniform distribution of the filler throughout the mold.

This thickening, or gelling process is vital to the production of the molding composition. The thickening must be slow enough to allow wet-out and impregnation of the glass reinforcement. However, the thickening must be fast enough to allow the handling required by molding operations as soon as possible in order to keep the amount of sheet in storage at a low inventory level. While the thickening must give a viscosity at molding temperatures low enough to permit sufficient flow to fill out the mold at reasonable pressure, the thickening must give a viscosity high enough to carry the glass filler or other reinforcement along as the composition flows in the mold. Ideally, however, and this is the aspect where prior art molding compositions have proved unsatisfactory, thickening should stop or the rate of thickening should substantially decrease in a viscosity range which permits molding at low pressures, that is, at pressures within the range of from about 30 to about 250 pounds per square inch in contrast to the 500 to 1500 pounds per square inch required by prior art molding compounds.

The prior art molding compounds thicken at rapid initial rates and continue at substantially a constant rate or only at slightly decreased rates after the initial period. The result has been that by the time the composition is found to be peelable from its wrapping and handleable, the viscosity of the molding composition has reached such a high value that the composition is moldable only at high pressures. In other words, the prior art molding compounds have not possessed that balance between "peelability", or "handability", and viscosity as is required for low pressure molding. They remain tacky until their viscosity is greater than about 20,000,000 cps., that is, they become tack free at viscosities such that they can be molded only at high pressures.

The present invention provides a molding composition which attains a viscosity at which the composition can be handled readily, which viscosity is low enough to permit molding the composition at low pressures. In other words, the molding composition of this invention reaches a state at which it can be separated from the polyethylene film without significant adherence of the composition thereto and at which state the composition can be molded at low pressure to produce uniform distribution of all components within the mold. In certain instances, the composition becomes handleable at a point near which its increase in viscosity approaches zero. The composition may even become handleable at a point after which its viscosity tends to decrease somewhat. In any instance, the composition becomes handleable at a viscosity low enough to enable its being molded at low pressure.

According to the present invention, there is provided a moldable composition comprising an unsaturated, crosslinkable polyester, a monomer, a thermoplastic soluble in the monomer and a gelling agent consisting essentially of calcium hydroxide, the gelling agent being present in an amount sufficient to render the composition non-tacky or handable at a substantially stable viscosity at which the composition can be molded at low pressures of from about 30 to about 250 pounds per square inch.

In the preferred embodiment of this invention, the calcium hydroxide will be present in an amount within the range of from about 0.7 to about 1.2 parts per hundred parts of resin and the composition will be non-tacky and moldable at a low pressure within the range of from about 30 to about 250 pounds per square inch.

More specifically, the molding composition will attain a viscosity of from about 3 to about 12 million centipoises within a period of approximately 24 hours after the onset of gelling and will attain a viscosity of from about 10 million to about 18 million centipoises within a period of approximately 48 hours after the onset of gelling. Sometime within the period of from about 24 to about 48 hours after the onset of gelling, the composition will attain a substantially stable viscosity, that is, the viscosity will increase at a rate less than about 20,000 centipoises per hour. As a result, the molding composition of this invention can be molded at low pressures within the range of from about 30 to about 250 pounds per square inch at a platen temperature within the range of from about 240° to about 300° F with a cure cycle of up to about 4 minutes.

As used herein, molding composition viscosities unless otherwise stated, refer to Brookfield viscosities, model HBT with Helipath stand and T-bars, this method and its values being familiar to those skilled in the art.

The moldable compositions of this invention will have an initial viscosity when first compounded and prior to any significant period of gelling of less than about 100,000 centipoises and preferably a viscosity within the range of from about 20,000 to about 60,000 centipoises (Brookfield TA Spindle, 20 RPM at room temperature). The moldable composition will be comprised, preferably, of the following components:

a. an unsaturated, crosslinkable polyester resin in an amount within the range of from about 55 to about 80 parts by weight per 100 parts by weight of total resin. The polyester resin will be employed in the form of a monomer-containing syrup having a solids or resin content of approximately 33 percent by weight. The polyester resin will have an acid number, or value, within the range of from about 15 to about 45, and preferably about 35. It will have a molecular weight within the range of from about 1,500 to about 2,500;

b. a thermoplastic resin having an acid number up to about 3, the thermoplastic being present in the composition in an amount within the range of from about 20 to about 45 parts by weight per 100 parts by weight of total resin. The thermoplastic resin will be employed in the form of a monomer-containing syrup having a solids content of approximately 33 percent. The thermoplastic will have a preferred acid number of about 0.3. The thermoplastic will have a molecular weight within the range of from about 80,000 to about 350,000, preferably within therange of from about 100,000 to 250,000 the range with a molecular weight of about 160,000 being preferred. (As used herein, "molecular weight" refers to weight average molecular weight);

c. a monomer in which the acid-functional thermoplastic is soluble;

d. a mold release agent, or internal lubricant, in an amount of from about 0.5 to about 4 parts by weight per 100 parts by weight of resin;

e. one or more fillers in an amount within the range of from about 25 to about 180 parts by weight per 100 parts by weight of resin;

f. chopped glass fibers in an amount within the range of from about 10 to about 35 parts by weight per 100 parts by weight of resin;

g. a crosslinking catalyst in an amount within the range of from about 0.1 to about 3 parts by weight per 100 parts by weight of resin; and, h. a gelling agent consisting essentially of calcium hydroxide in an amount within the range of from about 0.7 to about 1.2 parts by weight per 100 parts by weight of resin.

In its preferred embodiment, the thermoplastic will have an acid number of about 0.3 and the gelling agent will be present in an amount of about 1 part of weight per 100 parts by weight of resin.

The unsaturated polyesters which can be employed in this invention are the poly condensation-products of at least one αβ-ethylenically unsaturated dicarboxylic acid (which term as used herein includes the corresponding anhydrides) and dihydric alcohols or oxides.

Suitable unsaturated dicarboxylic acids include maleic anhydride, fumaric acid, itaconic acid, citraconic acid and chloromaleic acid and the like, and mixtures thereof. Preferred materials are maleic anhydride and fumaric acid. A minor proportion of the unsaturated dicarboxylic acid, that is, up to about 25 mole percent, can be replaced by saturated carboxylic acids such as ortho-phthalic acid, succinic acid, adipic acid, sebacic acid, methyl-succinic acid and the like, and their mixtures.

Suitable dihydric glycols and oxides which can be employed include 1,2-propaneldiol, dipropylene glycol, ethylene glycol, diethylene glycol, 1,3-butanediol, 1,4-butanediol, neopentyl glycol, triethylene glycol, tripropylene glycol, ethylene oxide and the like, and mixtures thereof.

The unsaturated polyester will be soluble in the after-defined monomers in which it will be crosslinkable during the molding process to a thermoset, continuous phase in which the thermoplastic will exist as the disperse phase.

The thermoplastic is a polymer or copolymer or mixture thereof which is prepared employing a free-radical initiator and at least one ethylenically unsaturated monomer. Suitable monomers include alkyl methacrylates and alkyl acrylates in which the alkyl group contains up to about 18 carbon atoms, including alkyl groups chosen from methyl, ethyl, n-propyl, iso-propyl, n-butyl, isobutyl, 2-ethylhexyl, stearyl and the like, and mixtures thereof. Also suitable are cyclic methacrylates and acrylates wherein the cyclic group is chosen from cyclohexyl, benzyl, bicyclic groups such as isobornyl, bornyl, fenchyl, isofenchyl, and the like. Particularly suitable are monovinyl aromatic compounds such as styrene, substituted styrenes such as α-methyl styrene, vinyl toluene, tert-butylstyrene, halogen substituted styrenes such as chlorostyrene, dichlorostyrene and the like, and mixtures thereof. Also employable are acrylonitrile, methacrylonitrile, and mixtures of vinyl chloride and vinyl acetate. Cellulose acetate butyrate and cellulose acetate propioniate can also be used.

Preferred thermoplastics are formed from about 80 to about 99.9 weight percent styrene copolymerized with acrylic acid and, or, methacrylic acid in an amount within the range of from about 0.05 to about 1.9 weight percent; or with acrylonitrile in an amount within the range of from about 1.3 to about 20 weight percent; or with hydroxyethyl acrylate in an amount within the range of from about 1.3 to about 20 weight percent. Suitable thermoplastic compositions also include graft polymers of styrene and polybutadiene, styrene and styrene-butadiene polymers and the like containing from about 70 to about 97 weight percent styrene and from about 3 to about 30 weight percent of the elastomeric group.

As mentioned, the thermoplastic will have an acid number of up to about 3, the acid functionality being incorporated in the thermoplastic employing suitable carboxylic or other acid-functional substituents such as acrylic acid, methacrylic acid and the like. The preferred thermoplastic comprises the reaction product of about 100 parts by weight of styrene and about 0.05 parts by weight acrylic acid, the acid functionality being incorporated in the thermoplastic as a component of the monomer system used to prepare the polymer.

The monomer will be one in which the thermoplastic is soluble and which is copolymerizable with the unsaturated polyester to produce a crosslinked, thermoset matrix. The monomer is a liquid monomer or mixture of monomers having at least one polymerizable reactive, ethylenically unsaturated (—C=C<) group per molecule. The monomer system can be chosen from the group consisting of styrene, substituted styrenes such as vinyl toluene, tert-butyl styrene, lower (i.e. $C_2$ to $C_4$) alkyl esters of acrylic and methacrylic acids, α-methyl styrene, cyclic acrylates, methacrylates such as cyclohexyl methacrylate and acrylate, benzyl methacrylate and acrylate and the like, bicyclic methacrylates and acrylates such as isobornyl methacrylate and acrylate, halogenated styrenes such as chlorostyrene, dichlorostyrene, 1,3-butanediol dimethacrylate, diallyl phthalate and the like, and mixtures thereof.

The mold release agents which can be used in this invention are those well known in the art and include stearates of zinc, calcium, aluminum and the like.

Various types and concentrations of fillers can be employed in the present invention, these including clay, talc, mica, calcium carbonate, silicas, carbon black, glass fibers and the like. In the composition of the present invention, calcium carbonate and chopped glass fibers are employed in the preferred embodiment.

The crosslinking catalysts will be such as are conventionally employed. These comprise free radical catalysts which do not degrade until molding temperatures are attained but which provide fast cure after gelation. Among the catalysts which can be employed are benzoyl peroxide, tert-butyl perbenzoate, tert-butyl peroxide, tert-butyl peroctoate, lauroyl peroxide, and the like.

The gelling agent employed in this invention will consist essentially of calcium hydroxide. As shown by the data presented hereinafter, magnesium hydroxide cannot be used within the prescribed ranges inasmuch as magnesium hydroxide permits the viscosity of the molding composition to increase at such a rapid rate that by the time the system is handleable, that is, as qualitatively evaluated herein as being peelable from the polyethylene film in which it is customarily wrapped, the viscosity of the system has become so high that pressures of 500 pounds per square inch and upward are required to properly distribute the molding composition uniformly throughout the mold.

In contrast, however, the use of calcium hydroxide as a gelling agent causes the viscosity of the molding composition to increase to a value within the range of from about 4 million to about 12 million centipoises, within which range the molding composition is handleable, that is, peelable from the thermoplastic wrapper in which it is stored with no appreciable adherence thereto upon separation of the film from the composition.

Furthermore, it has been found that molding compositions employing significantly higher levels of calcium hydroxide than about 1.2 parts per hundred parts of resin will thicken to such a high viscosity by the time they are handleable that they can only be molded at high pressures. On the other hand, molding compositions employing significantly lower levels of calcium hydroxide that about 0.7 parts per hundred parts of resin will remain tacky and therefore unhandleable for impractical periods of time.

Relatedly, if the resins employed have acid numbers higher than defined above, by the time the composition becomes handleable, the viscosity is so great that only high pressures can be successfully employed for molding. However, if no acid or polar functionality is employed in the molding composition, the composition will bleed unbound thermoplastic to the surface of the composition.

The invention will be illustrated by the following examples which are illustrative of the invention but are not to be considered as limiting the invention to the specific materials employed inasmuch as the invention is employable with all resins normally used to produce molding compounds which have acceptable properties in respect to profile, sink and shrink.

The following examples illustrate the individual blending of a plurality of thermoplastic compounds with a common thermosetting polyester, the employment of these blends in molding compounds and the results of gelling these blends with either calcium hydroxide or magnesium hydroxide in respect to handleability and changes in viscosity over various periods of time. As previously indicated, the handleability of gelled compounds is qualitatively evaluated by the ability to peel the molding compound from the polyethylene film in which it is stored during gelling. As will be recognized by those skilled in the art, the molding compound is handleable when it can be peeled from both the upper and lower film without leaving adhered to the film any such quantity of the molding compound as to destroy the continuous, sheet-like properties of the molding compound or create such voids in the unmolded sheet as would adversely effect the continuity of the surface of the molded product.

All thermoplastic resins were blended, individually, with a common polyester, the preparation of which is set forth in Example I.

EXAMPLE I

A thermosetting polyester resin syrup was prepared from the following materials in substantially the following manner.

| Materials | Parts by Weight |
| --- | --- |
| Propylene Glycol | 578.2 |
| Maleic Anhydride | 674.4 |
| Toluhydroquinone Solution (25% solution in styrene) | 6.8 |

The polyester resin syrup was prepared by charging all of the propylene glycol and one-third of the maleic anhydride into the reactor while using a continuous nitrogen sparge. The temperature of the contents of the reactor was raised to 190° F and about 4 hours after the first distillate, about one-half of the toluhydroquinone solution was added. When the reactor contents had reached an acid value of about 35, the remainder of the toluhydroquinone solution was added. Thereafter, the remainder of the maleic anhydride was added at a rate of 10 to 15 parts per minute while controlling the temperature of the mixture at 300° F. Thereafter, the temperature of the mixture was held at 310° to 320° F for 60 minutes, after which the temperature was increased to 400° F. The material in the reactor at this point had an acid number of 29 to 32 and 2 parts of the reactor contents diluted with one part of styrene had a viscosity of 21 to 25 at 350° F. (SSU.)

The contents of the reactor were cooled to 340° F and diluted with styrene in an amount of 90 parts of reactor contents to 10 parts of styrene to produce a composition stable for 30 minutes at 120° C before gelling.

In another vessel, 486.4 parts by weight of styrene and 0.125 parts by weight of mono-tertiary butyl hydroquinone were mixed and held at a temperature within the range of 130° to 145° F. Thereafter, 1,138 parts by weight of the polyester resin, produced as described above and at a temperature of about 330° F were added to the styrene-hydroquinone mixture to produce a thinned polyester syrup which, at a temperature of 180° F, had a viscosity in the range of 1500 to 2000 cps., a maximum water content of about 0.08 weight percent and a monomer content within the range of about 30 to about 34 weight percent.

This polyester had an acid value of 30 and a molecular weight of 2,050.

EXAMPLE II

This example illustrates the preparation of three thermoplastic resins, each of which was subsequently blended with the thermosetting resin produced in Example I, as herein described.

The components of the thermoplastics and their method of preparation was as follows:

| Thermoplastic Composition, (Parts by Weight) | I | II |
|---|---|---|
| Styrene | 994.5 | 994.5 |
| Acrylonitrile | 4.5 | 0 |
| 2-hydroxyethyl acrylate | 0 | 4.5 |
| Benzoyl Peroxide | 1.5 | 1.5 |
| Toluhydroquinone | 0.4 | 0.4 |

In each instance, all materials except the toluhydroquinone were charged to the reactor. The contents of the reactor were purged with nitrogen while being heated to 70° C, which temperature was maintained until a solids content of 33.3% was attained. Thereupon, the toluhydroquinone was added to the reactor contents, the contents were allowed to cool and the thermoplastics were individually recovered. These thermoplastics had an acid number of 0 and a molecular weight of 143,000 and 152,000, respectively.

Employing substantially the same procedure, the following thermoplastic composition was prepared:

| Thermoplastic Composition (Parts by Weight) | III |
|---|---|
| Styrene | 1000 |
| Acrylic Acid | 0.5 |
| 2-hydroxyethyl acrylate | 0 |
| Benzoyl Peroxide | 1.5 |
| Toluhydroquinone | 0.4 |

This thermoplastic had an acid number of 0.3 and a molecular weight of 163,000.

Each of the thermoplastics prepared above, was individually incorporated in a molding composition with the resin produced in Example I, the principal difference in each series of compounds being in the amount of magnesium hydroxide or calcium hydroxide employed as a gelling agent. The molding paste formulations, three of which employed magnesium hydroxide as the gelling agent and two of which employed calcium hydroxide as the gelling agent, fifteen compositions in all being prepared were as follows, all components being expressed in parts by weight:

| Molding Compound Paste Formulations | | | | | |
|---|---|---|---|---|---|
| Composition No. Components, parts by weight | I | II | III | IV | V |
| Thermoplastic I, II or III | 141 | 141 | 141 | 141 | 141 |
| Resin of Example I | 211 | 211 | 211 | 211 | 211 |
| Zinc Stearate | 12 | 12 | 12 | 12 | 12 |
| Calcium Carbonate | 52 | 52 | 52 | 52 | 52 |
| Magnesium Hydroxide | 5.0 | 3.5 | 2.0 | 0 | 0 |
| Calcium Hydroxide | 0 | 0 | 0 | 3.5 | 2.0 |

Viscosity determinations were made on all paste formulations at the end of four days.

"Peelability" or the moldability of the compositions were determined by pouring each paste composition individually on a 12 inches square sheet of polyethylene film. A second sheet of film was placed on top of the paste composition and a constant load was placed thereon to flatten the paste between the sheets of plastic films. At a point coincidental with the viscosity determinations, the samples were tested by peeling the top and bottom film from the molding composition. Results were as follows:

TABLE I

| Molding Compound Formulation | Thermoplastic | Gelling Agent | Amount of Gelling Agent* | Viscosity after 6 Days, MM cps. | Peelability Top Film | Bottom Film |
|---|---|---|---|---|---|---|
| I | I | Mg(OH)₂ | 1.42 | 780 | Yes | No |
| II | I | " | 1.0 | 28.8 | Yes | No |
| III | I | " | 0.57 | 4.7 | Slightly | No |
| IV | I | Ca(OH)₂ | 1.0 | 11.5 | Yes | Yes |
| V | I | " | 0.57 | 1.6 | No | No |
| I | II | Mg(OH)₂ | 1.42 | 72.8 | Yes | No |
| II | II | " | 1.0 | 3.7 | No | No |
| III | II | " | 0.57 | 2.8 | No | No |
| IV | II | Ca(OH)₂ | 1.0 | 6.3 | Yes | Yes |
| V | II | " | 0.57 | 1.2 | No | No |
| I | III | Mg(OH)₂ | 1.42 | 68.4 | Yes | Slightly |
| II | III | " | 1.0 | 13.0 | Yes | No |
| III | III | " | 0.57 | 2.8 | No | No |
| IV | III | Ca(OH)₂ | 1.0 | 8.2 | Yes | Yes |
| V | III | " | 0.57 | 1.6 | No | No |

*Parts per hundred parts of resin.

The above data indicate that in no instance did magnesium hydroxide produce a molding compound which could be peeled from both the films at a viscosity within the range of 4 to 12 million centipoises. Therefore, magnesium hydroxide in a concentration of from about 0.7 to about 1.2 parts per hundred parts of resin is incapable of producing a composition moldable at low pressures.

Secondly, the data indicate that in all instance calcium hydroxide did produce a molding compound which could be peeled from the film at a viscosity within the range of from about 4 million to about 12 million centipoises when employing the calcium hydroxide in an amount within the range of from about 0.7 to about 1.2 parts per hundred parts by resin. However, when employing calcium hydroxide at a concentration below the aforesaid range, a peelable composition was not obtained.

EXAMPLE III

A second series of thermoplastics was prepared employing the following components.

| Thermoplastic Number Component, parts by weight | VI | VII | VIII |
|---|---|---|---|
| Styrene | 945 | 915 | 915 |
| Solprene 1205C* | 20 | 30 | 30 |
| Poly BDR - 45-HT** | 35 | 55 | 55 |
| Acrylic Acid | 0.5 | 0.5 | 0 |
| Benzoyl peroxide | 1.5 | 1.5 | 1.5 |
| Toluhydroquinone | 0.4 | 0.4 | 0.4 |

*Solprene - a 25/75 styrene-butadiene block copolymer available from Phillips Petroleum Co.
**PolyBDR-45-HT - a polybutadiene polymer available from Arco Chemical Co.

The thermoplastics were produced as described in Example II except that the polymerization was conducted at 75° C. They had an acid value of about 0.3 and a molecular weight of about 240,000.

These thermoplastics were then individually incorporated into a sheet molding compound employing the thermosetting resin of Example I. Each thermoplastic was incorporated into each of the following molding pastes, all components being expressed in parts by weight.

| Molding Compound Paste Formulations | | | |
|---|---|---|---|
| Composition Number | I | II | III |
| Thermoplastic VI, VII or VIII | 141 | 141 | 141 |
| Resin of Example I | 211 | 211 | 211 |
| Zinc Stearate | 12 | 12 | 12 |
| Calcium Carbonate | 520 | 520 | 520 |
| Calcium Hydroxide | 3.5 | 3.0 | 2.5 |

Viscosities and peelabilities were determined as described above with the following results:

TABLE II

| Molding Compound | Thermo-plastic | Gelling Agent | Amount of Gelling Agent * | Viscosity after 24 hrs., MM cps. | Peelability Top Film | Peelability Bottom Film | Viscosity after 48 hrs., MM cps. | Viscosity after 120 hrs., MM cps. |
|---|---|---|---|---|---|---|---|---|
| I | VI | Ca(OH)₂ | 0.99 | 40 | Yes | Yes | — | — |
| II | VI | Ca(OH)₂ | 0.85 | 8.5 | Yes | Yes | 7.5 | 7.7 |
| III | VI | Ca(OH)₂ | 0.71 | 4.2 | Yes | Yes | 4.5 | 4.1 |
| I | VII | Ca(OH)₂ | 0.99 | 54.5 | Yes | Yes | — | — |
| II | VII | Ca(OH)₂ | 0.85 | 10.6 | Yes | Yes | 9.5 | 9.2 |
| III | VII | Ca(OH)₂ | 0.71 | 7.1 | Yes | Yes | 6.4 | 6.9 |
| I | VIII | Ca(OH)₂ | 0.99 | 42 | Yes | Yes | — | — |
| II | VIII | Ca(OH)₂ | 0.85 | 22.6 | Yes | Yes | 18.0 | 16.8 |
| III | VIII | Ca(OH)₂ | 0.71 | 12.6 | Yes | Yes | 8.5 | 8.0 |

* Parts per hundred parts of resin.

It will be seen from the above data that the amount of calcium hydroxide satisfactorily employed was within the range of from about 0.7 to about 1.2 parts per hundred parts of resin. It will also be seen that in each instance in which the calcium hydroxide was effective, the viscosity attained a maximum value of about 18 million within a period of about 48 hours after the onset of gelling, after which the compositions attained a substantially stable viscosity, either decreasing only slightly or increasing at a rate less than about 20,000 centipoises per hour.

In those cases in which the molding compositions were peelable but which attained too high a viscosity for low pressure molding, it is evident that had an amount of gelling agent of about 1.2 parts per hundred parts of resin been employed, viscosities low enough to permit low pressure molding would have been attained.

It will be evident from the foregoing that various modifications can be made to this invention. Such, however, are considered as being within the scope of the invention.

What is claimed is:

1. A method of producing a molded composition comprising:
   a. forming a mixture of an unsaturated, crosslinkable thermosetting resin, an ethlenically unsaturated first monomer and a thermoplastic resin soluble in said first monomer, said thermoplastic resin comprising the reaction product of a second monomer with a mixture comprising a styrene-butadiene copolymer and a polybutadiene polymer, said second monomer being reacted with both said styrene-butadiene copolymer and said polybutadiene polymer;
   b. aging said mixture in contact with a gelling agent consisting essentially of calcium hydroxide or magnesium hydroxide in an amount sufficient to gell said composition to a viscosity at which said composition is moldable, and,
   c. molding said mixture to produce a molded composition.

2. The method of claim 1 in which said gelling agent is present in an amount within the range of from about 0.7 to about 1.2 parts per hundred parts of total resin.

3. The method of claim 1 in which said viscosity is within the range of from about 4 million to about 12 million centipoises.

4. The method of claim 1 in which said pressure is within the range of from about 30 to about 250 pounds per square inch.

5. The method of claim 2 in which said viscosity is within the range of from about 4 million to about 12 million centipoises.

6. The method of claim 2 in which said pressure is within the range of from about 30 to about 250 pounds.

7. The method of claim 5 in which said pressure is within the range of from about 30 to about 250 pounds.

8. The method of claim 1 in which said thermosetting resin has an acid value within the range of from about 15 to about 45 and a molecular weight within the range of from about 1,500 to about 2,500.

9. The method of claim 8 in which said thermoplastic resin has an acid value up to about 3 and a molecular weight within the range of from about 80,000 to about 350,000.

* * * * *